United States Patent
Fu et al.

(10) Patent No.: US 11,460,119 B2
(45) Date of Patent: Oct. 4, 2022

(54) OIL RETURNING VALVE SET WITH MULTI-STAGE THROTTLING CONTROL

(71) Applicant: SHINN FU CORPORATION, Taipei (TW)

(72) Inventors: Jiang Feng Fu, Kunshan (CN); Neng Hua Li, Kunshan (CN)

(73) Assignee: SHINN FU CORPORATION, Taipei (TW)

( * ) Notice: Subject to any disclaimer, the term of this patent is extended or adjusted under 35 U.S.C. 154(b) by 209 days.

(21) Appl. No.: 16/712,889

(22) Filed: Dec. 12, 2019

(65) Prior Publication Data
US 2021/0131456 A1    May 6, 2021

(30) Foreign Application Priority Data
Nov. 4, 2019   (TW) .................................. 108139940

(51) Int. Cl.
*F16K 15/00* (2006.01)
*F16K 15/03* (2006.01)
(Continued)

(52) U.S. Cl.
CPC .............. *F16K 15/035* (2013.01); *B66F 3/25* (2013.01); *F15B 13/023* (2013.01); *F16K 17/30* (2013.01);
(Continued)

(58) Field of Classification Search
CPC ........ B66F 5/04; F15B 13/023; F15B 13/204; F16K 2200/202; Y10T 137/7785;
(Continued)

(56) References Cited

U.S. PATENT DOCUMENTS 4,703,916 A * 11/1987 Hung ........................ B66F 3/42
                                                    254/93 H
5,085,246 A *  2/1992 Griinke ................... F16K 17/30
                                                    137/504
(Continued)

FOREIGN PATENT DOCUMENTS

CN          1530318 A    9/2004
CN        101700861 A    5/2010
(Continued)

*Primary Examiner* — Robert K Arundale
(74) *Attorney, Agent, or Firm* — Chun-Ming Shih; HDLS IPR Services

(57) ABSTRACT

An oil returning valve set with multi-stage throttling control includes an oil returning channel implemented in oil in an oil hydraulic equipment. The two ends of the oil returning channel are connected to a pressurized oil collecting cavity and a pressurized oil discharging cavity respectively. A plurality of throttling valve plugs and oil returning valve plug are arranged in the oil returning channel, and a normally-open draining gap is also formed among the plurality of throttling valve plugs. When the oil returning valve plug is opened, a plurality of the throttling valve plugs are arranged in series to generate multi-stage throttling oil hydraulic draining control, which improves the problem that the valve opening allowance of the throttling valve for oil returning and pressure relief of traditional oil hydraulic equipment is not sufficient.

18 Claims, 5 Drawing Sheets

(51) Int. Cl.
*B66F 3/25* (2006.01)
*F16K 17/30* (2006.01)
*F15B 13/02* (2006.01)
*F15B 15/18* (2006.01)
*F15B 15/20* (2006.01)

(52) U.S. Cl.
CPC ............ *F15B 13/027* (2013.01); *F15B 15/18* (2013.01); *F15B 15/202* (2013.01); *F15B 15/204* (2013.01); *F15B 2211/40576* (2013.01); *F15B 2211/46* (2013.01); *F16K 2200/202* (2021.08); *Y10T 137/7869* (2015.04)

(58) Field of Classification Search
CPC ......... Y10T 137/7839; Y10T 137/7841; Y10T 137/7848; Y10T 137/7869; Y10T 137/87499
USPC .......................................................... 91/404
See application file for complete search history.

(56) References Cited

U.S. PATENT DOCUMENTS

| | | |
|---|---|---|
| 5,946,912 A | 9/1999 | Hung |
| 6,035,635 A | 3/2000 | Hung |
| 6,374,852 B1* | 4/2002 | Olivas ..................... F16K 17/30 |
| | | 137/493.9 |
| 7,194,857 B2 | 3/2007 | Hung |
| 8,333,365 B2 | 12/2012 | Dai |
| 9,809,431 B2 | 11/2017 | Chen et al. |
| 9,850,923 B2* | 12/2017 | Lautzenhiser ........ F15B 15/204 |
| 2004/0187492 A1* | 9/2004 | Cheng ................... F15B 13/023 |
| | | 60/481 |
| 2013/0037132 A1* | 2/2013 | Schmoll ................. F16K 17/30 |
| | | 137/498 |

FOREIGN PATENT DOCUMENTS

| | | |
|---|---|---|
| CN | 104692279 A | 6/2015 |
| CN | 104692279 B | 10/2018 |
| EP | 1460026 A1 | 9/2004 |

* cited by examiner

OIL RETURNING VALVE SET WITH MULTI-STAGE THROTTLING CONTROL

FIELD OF THE INVENTION

The present invention relates to the oil returning control technology of the oil in the oil hydraulic channel, and relates to a throttling valve structure arranged in the oil returning channel, and particularly relates to an oil returning valve set with multi-stage throttling control.

DESCRIPTION OF RELATED ART

Oil hydraulic channels are generally provided in oil hydraulic instruments. Oil hydraulic instruments use oil hydraulic passages to transmit oil, and oil hydraulic instruments are usually provided with oil pumps and piston rods connected to the oil hydraulic passages. The oil pump pressurizes oil in the oil hydraulic channel to perform a pressurizing effect, and the pressurized oil is used to push the piston rod to perform the required function operation.

Taking a jack as an example, it is the most common hydraulic instrument in the field. The hydraulic instrument must have an oil chamber (hereinafter referred to as a pressurized oil collecting cavity) for gathering oil pressure to drive the piston rod to raise and lift heavy objects, and an oil storing tank (hereinafter referred to as an pressurized oil discharging cavity) capable of accumulating circulating oil and supplying oil for the oil pump to capture oil. Among them, after the oil pressure in the pressurized oil collecting cavity drives the piston rod to lift a heavy object, the oil in the pressurized oil collecting cavity must be returned to the pressurized oil discharging cavity to be stored in preparation for the oil pump to drive the oil supply again, and thereby drain the pressurized oil collecting cavity and oil pressure resets the piston rod. To this end, there is an oil returning channel between the pressurized oil collecting cavity and the pressurized oil discharging cavity. The oil returning channel is usually provided with an oil returning valve and a throttling valve. The oil returning valve can control the opening of the oil returning channel, and when it is closed, the throttling valve can control the flow of oil returning in the oil returning channel, and then control the reset speed of the piston rod in the pressurized oil collecting cavity.

In the prior arts, CN1530318A and CN104692279A (that is, WO2016149968) patents disclose the installation of different throttling valve structures composed of blocking ball and spiral compression springs in the oil returning channel. The elastic force of the spring controls the flow of oil from the pressurized oil collecting cavity back to the pressurized oil discharging cavity. It can also maintain a normally-open draining gap when the high pressure oil is loaded in the pressurized oil collecting cavity to prevent the throttling valve from being stuck. Dead or damaged, resulting in a dangerous situation that the high pressure oil loaded in the pressurized oil collecting cavity cannot be discharged, and the piston rod of the jack cannot be lowered and reset.

However, in the above-mentioned prior arts, especially the throttling valve installed in the oil returning channel, the valve opening allowance for adjusting the oil returning flow is not sufficient, and it relatively affects hydraulic equipment, such as jacks, it can be recommended (i.e. Load) the pressure range of the weight, and the reset speed of the adjustable piston push rod is also relatively limited within this pressure range.

SUMMARY OF THE INVENTION

In view of this, the purpose of the present invention is to improve the throttling valve installed in the oil returning channel of the existing hydraulic instruments. The valve opening allowance for adjusting the oil returning flow is not sufficient and affects the pressure range that the pressure instrument can push (i.e. load) the heavy object and the reset speed of the adjusting piston push rod of the oil hydraulic instruments within the pressure range, which are both limited.

In order to achieve the above object and to solve the problem, the present invention provides an oil returning valve set with multi-stage throttling control. The technical means of the present invention is to provide an oil returning valve set with multi-stage throttling control comprising:

an oil returning channel formed in an oil hydraulic equipment, and both ends of the oil returning channel are respectively connected to a pressurized oil collecting cavity and a pressurized oil discharging cavity of oil in an oil hydraulic equipment;

a plurality of throttling valve plugs arranged at an inlet end of the oil returning channel, and controlling the oil in the pressurized oil collecting cavity to flow to the oil returning channel; and an oil returning valve plug arranged at an outlet end of the oil returning channel, and controlling the flow of oil in the oil returning channel to the pressurized oil discharging cavity;

wherein a plurality of the throttling valve plugs are arranged in series and each load has a different elastic force, a normally-open draining gap is formed in the plurality of throttling valve plugs, and the normally-open draining gap is used for connecting between the pressurized oil collecting cavity and the oil returning channel.

According to the above technical means of the present invention, the technical effects that the present invention can produce are:

1. Relying on a plurality of throttling valve plugs with different elastic forces for their respective loads, it is easy to increase the valve opening margin when adjusting the return oil flow, thereby increasing the throttle control range of the oil pressure value in the pressurized oil collecting cavity, so that the oil returning channel is equipped with a multi-stage throttling function to control the oil returning pressure, so as to increase the pressure range of the hydraulic equipment for pushing (that is, load) heavy objects, and within this pressure range, a multi-stage adjusting piston push rod reset speed function is achieved.

2. A plurality of the throttling valve plugs are arranged in series, which can save the volume of the throttle structure, and is easy to assemble in the oil returning channel.

3. Utilize the normally-open draining gap in the oil returning channel to provide oil hydraulic equipment, even when heavy oil is loaded in the pressurized oil collecting cavity, a small flow of pressure relief function can be maintained to avoid causing a dangerous situation occurs in which the piston rod of the jack cannot be lowered and reset.

In a further implementation of the present invention, a valve seat is arranged between the pressurized oil collecting cavity and the pressurized oil discharging cavity of the oil hydraulic equipment, and the oil returning channel is arranged in the valve seat and further it is formed in the oil hydraulic equipment. The oil returning channel can be arranged in a straight line along an axis line, and a plurality of the throttling valve plugs and the oil returning valve plug are arranged along the axis line. In this way, it is convenient to process or assemble the oil returning channel in the hydraulic instrument, and it is convenient to assemble a plurality of the throttling valve plugs and the oil returning valve plugs.

In a further implementation of the present invention, a plurality of the throttling valve plugs comprise an inner valve plug and an outer valve plug, and the inner valve plug is coaxially sleeved and arranged on an inside of the outer valve plug, and the normally-open draining gap is formed between the inner valve plug and the outer valve plug. The normally-open draining gap can also be implemented as a draining hole with a fixed aperture, and the oil draining hole is formed inside the plug body of the inner valve plug. With these implementations of the present invention, a small flow of pressure relief function can be maintained under the condition of heavy oil load in the pressurized oil collecting cavity to avoid the danger that the piston rod of the jack cannot be lowered and reset.

In a further implementation of the present invention, an inner valve plug accommodation chamber and an inner valve hole communicating with each other are formed in the outer valve plug, and the inner valve plug in cooperation with an inner layer elastic element is disposed in the inner valve plug accommodating chamber, and the inner valve plug is formed with a stopper rod that can move through the inner valve hole, and the normally-open draining gap is formed between the stopper rod and the inner valve hole.

In a further implementation of the present invention, an annular first oblique cone surface is formed on an outer wall of the stopper rod, and the inner valve hole is oppositely formed with an annular second oblique cone surface, the first oblique cone surface and the second oblique cone surface are excluded from contacting, so that the normally-open draining gap is formed between the first oblique cone surface and the second oblique cone surface.

In a further implementation of the present invention, the slopes of the first oblique cone surface and the second oblique cone surface with respect to an axis line of the inner valve plug are not the same.

In a further implementation of the present invention, an annular hat portion is formed at an end of the stopper rod of the inner valve plug, and the diameter of the hat portion is relatively larger than that of the stopper rod, the inner layer elastic element is disposed between the hat portion and a wall surface of the inner valve plug accommodation chamber. Such implementation can effectively reduce the occupied volume of the plurality of throttling valve plugs arranged in the oil returning channel, so as to achieve the effects of small volume and refinement of the structure.

In a further implementation of the present invention, a plurality of the throttling valve plugs comprise an inner valve plug and an outer valve plug, the inner valve plug is coaxially sleeved and arranged on an inside of the outer valve plug, the normally-open draining gap is an oil draining hole with a fixed aperture, the oil draining hole is formed inside a plug body of the inner valve plug, and further it communicates between the pressurized oil collecting cavity and the oil returning channel.

In a further implementation of the present invention, a throttling valve chamber for communicating with the pressurized oil collecting cavity and an outer valve hole are formed at the inlet end, and the outer valve plug cooperates with an outer layer elastic element and is disposed in the throttling valve chamber to sense the oil pressure in the pressurized oil collecting cavity, and then controls the opening and closing of the outer valve hole.

In a further implementation of the present invention, a ring groove is formed between the throttling valve chamber and the oil returning channel, the diameter of the ring groove is between the hole diameters of the outer valve hole and the oil returning channel, an outer wall of the outer valve plug forms a retaining wall, and the outer layer elastic element is installed between the groove wall of the ring groove and the retaining wall.

In a further implementation of the present invention, the outer valve hole is formed with a ring-shaped oblique tapered hole wall, and the outer valve plug is formed with a ring-like oblique tapered plug wall, the slopes of the oblique tapered hole wall and the oblique tapered plug wall with respect to an axis of the outer valve plug are the same.

In a further implementation of the present invention, a plurality of the throttling valve plugs comprise an inner valve plug and an outer valve plug, and the outer valve plug is loaded with an elastic force of the outer layer elastic element, the inner valve plug is loaded with an integrated elastic force of the inner layer elastic element and the outer layer elastic element. The outer layer elastic element and inner layer elastic element may be a helical compression spring capable of generating different elastic forces. If implemented, the elastic force of the inner valve plug load can be made greater than the elastic force of the outer valve plug load, so that the inner and outer valve plugs can have the function of multi-stage throttling control of oil returning pressure to increase the valve opening allowance of the oil returning flow, to increase the pressure range of the hydraulic equipment to lift heavy objects, and to achieve the reset speed of the piston push rod with more adjustment function.

In a further implementation of the present invention, the oil returning channel between the inlet end and the outlet end is arranged in a straight line along an axis line, and a plurality of said throttling valve plugs and the oil returning valve plug are arranged along the axis line.

In a further implementation of the present invention, the outlet end forms an oil returning valve hole and a reflux valve chamber which communicate with the pressurized oil discharging cavity, the oil returning valve plug is arranged in the reflux valve chamber for regulating the opening and closing of the oil returning valve hole, an oil returning hole is also formed at the outlet end, and the oil returning valve hole communicates with the oil returning hole when it is opened.

In a further implementation of the present invention, the oil hydraulic equipment is a jack, the pressurized oil collecting cavity is an inner oil cylinder of the jack, and the pressurized oil discharging cavity is an oil tank of the jack.

For the specific implementation details of the above-mentioned technical means and its generating efficiency, please refer to the following embodiments and drawings for explanation.

DETAILED DESCRIPTION OF THE PREFERRED EMBODIMENT

Figure 1:
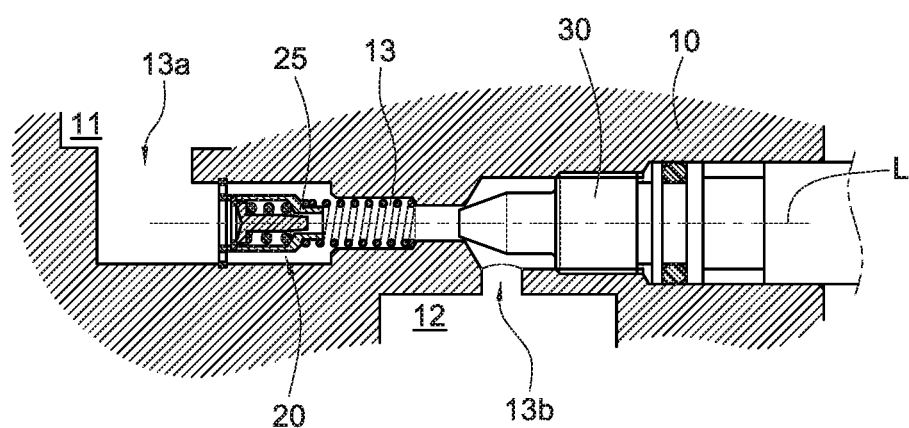
FIG. 1 is a sectional view of the first embodiment of the present invention illustrating that the oil returning valve set is implemented in a hydraulic instrument.

First, referring to FIG. 1, the first embodiment of the present invention is disclosed, and the oil returning valve set is implemented in the machine body 10 of a hydraulic instrument. More specifically, in the body 10 of the hydraulic instrument a pressurized oil collecting cavity 11 for providing oil pressure collecting and pushing heavy objects and a pressurized oil discharging cavity 12 for oil discharging pressure are formed. An oil returning channel 13 is also provided in the machine body 10 to communicate between pressurized oil collecting cavity 11 and the pressurized oil discharging cavity 12. The oil returning channel 13 may be formed in a straight line along an axial center line L, and the oil returning channel 13 may be formed by connecting a plurality of ladder-shaped circular channels with different diameters.

As can be seen from FIG. 1, a throttling valve set 20 and an oil returning valve plug 30 are disposed in the oil returning channel 13. Specifically, the throttling valve set 20 may be disposed along the axis line L to be located at an inlet end 13a of the oil returning channel 13. The inlet end 13a is adjacent to the pressurized oil collecting cavity 11 and the oil returning channel 13 communicates with the pressurized oil collecting cavity 11 via the inlet end 13a, so that a plurality of the throttling valve plugs 20 can be used for controlling the oil in the pressurized oil collecting cavity 11 to flow to the oil returning channel 13.

It can also be seen from FIG. 1 that the oil returning valve plug 30 can be disposed along an axis line L at an outlet end 13b of the oil returning channel 13, and the outlet end 13b is adjacent to the pressurized oil discharging cavity 12. The oil returning channel 13 communicates with the pressurized oil discharging cavity 12 via the outlet end 13b, so that the oil returning valve plug 30 can be used to control the flow of oil in the oil returning channel 13 to the pressurized oil discharging cavity 12.

Figure 2:
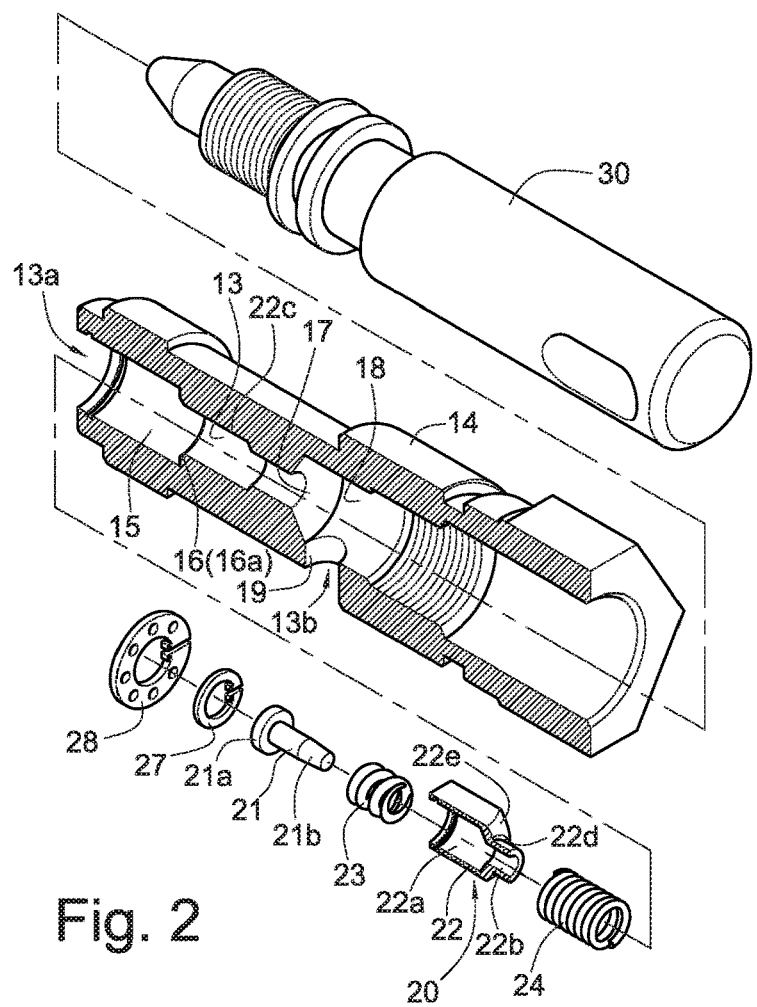
FIG. 2 is an exploded perspective view of a second embodiment of the present invention illustrating the assembled state of components required for the oil returning valve set.
Figure 3:
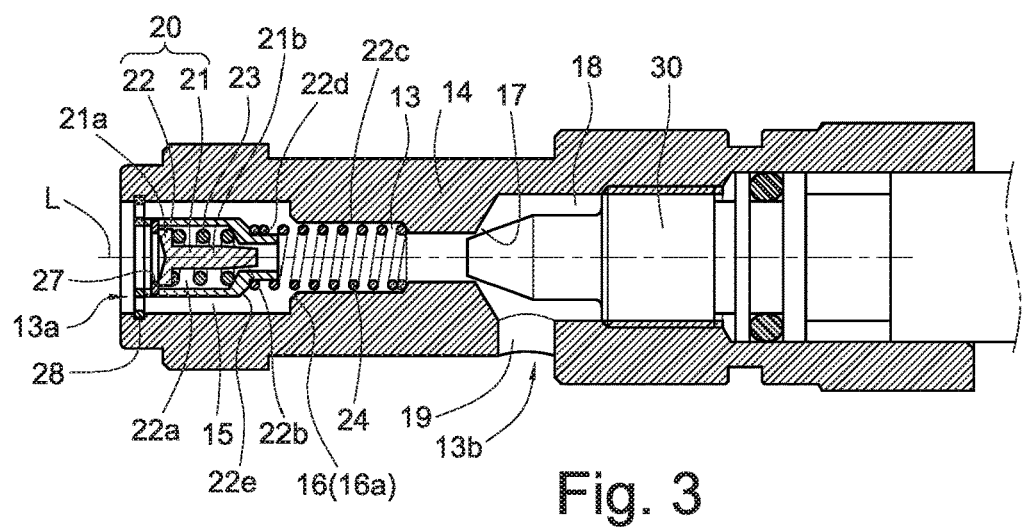
FIG. 3 is an assembly sectional view of FIG. 2 of the present invention illustrating that the oil returning valve set is assembled in the hydraulic instrument through a valve seat.

Secondly, please refer to FIG. 2 and FIG. 3 together to disclose the second embodiment of the present invention, and explain that the oil returning channel 13 can be passed through and arranged at a valve seat 14 in advance to facilitate that in the oil returning channel 13 of the valve seat 14 the above-mentioned throttling valve set 20 and the oil returning valve plug 30 are arranged in advance, and then the valve seat 14 is implanted in the machine body 10 so that the valve seat 14 can be seated between the pressurized oil collecting cavity 11 and the pressurized oil discharging cavity 12. In this way, it is more convenient to put through the oil returning channel 13 and to assemble the throttling valve set 20 and the oil returning valve plug 30.

As can be seen from FIG. 2 and FIG. 3, the inlet end 13a of the oil returning channel 13 is formed with a throttling valve chamber 15 and an outer valve hole 16 communicating with the pressurized oil collecting cavity 11. The throttling valve set 20 is arranged in the pressurized oil collecting cavity 11 to sense the oil pressure in the throttling valve chamber 15, and then the opening and closing of the outer valve hole 16 is regulated. The outlet end 13b is formed with an oil returning valve hole 17 and a reflux valve chamber 18 that communicate with the pressurized oil discharging cavity 12. The oil returning valve plug 30 is disposed in the reflux valve chamber 18 to control the opening and closing of the oil returning valve hole 17 and to control whether the oil in the oil returning channel 13 is depressurized and discharged into the pressurized oil discharging cavity 12. In addition, the outlet end 13b also forms an oil returning hole 19, which can be disposed in the machine body 10 shown in FIG. 1 or on the valve seat 14 shown in FIG. 3 so that when the oil returning valve hole 17 is opened, it communicates with the oil returning hole 19 to guide the pressure-reduced oil to be discharged into the pressurized oil discharging cavity 12.

It can also be seen from FIG. 2 and FIG. 3 that the throttling valve set 20 substantially comprises a plurality of annular throttling valve plugs, and the plurality of the throttling valve plugs comprise an inner valve plug 21 and at least one outer valve plug 22 having different elastic forces and having respective loads. The inner valve plug 21 and the outer valve plug 22 are arranged in series with each other. Specifically, the inner valve plug 21 can be sleeved and arranged inside the outer valve plug 22 in a coaxial concentric manner along the axis line L.

In the implementation disclosed in FIGS. 2 and 3 of the present invention, the inner valve plug 21 is an elastic force that loads an inner layer elastic element 23 and is arranged in series in the outer valve plug 22. The outer valve plug 22 is the elastic force that loads an outer layer elastic element 24 and disposed in the throttling valve chamber 15. More specifically, an outer retaining ring 28 is embedded and arranged in one side of the throttling valve chamber 15, and the outer retaining ring 28 can restrain the outer valve plug 22 in the throttling valve chamber 15 by loading the elastic force of the outer layer elastic element 24. In addition, the outer valve plug 22 is roughly made into a round sleeve shape with unequal inner diameter and unequal outer diameter, so that the outer valve plug 22 has an inner valve plug accommodation chamber 22a of different diameter but communicating with each other and an inner valve plug 22b. The inner valve plug 21 can be arranged in the inner valve plug accommodation chamber 22a in cooperation with the inner layer elastic element 23, and the arrangement manner can depend on an arrangement that at one side of the inner valve plug accommodation chamber 22a an inner retaining ring 27 is embedded and disposed. The inner retaining ring 27 can restrain the inner valve plug 21 in the inner valve plug accommodation chamber 22a by loading the elastic force of the inner layer elastic element 23.

Among them, the inner valve plug 21 is roughly formed into a shape in which an annular hat portion 21a at one end is connected to the stopper rod 21b at the other end, so that the cross section of the inner valve plug 21 is T-shaped, and the diameter of the hat portion 21a is relatively larger than that of the stopper rod 21b. The inner layer elastic element 23 is disposed between the hat portion 21a and the wall surface of the inner valve plug accommodation chamber 22a, and enables the stopper rod 21b to move through and to protrude into the inner valve hole 22b.

Figure 4:
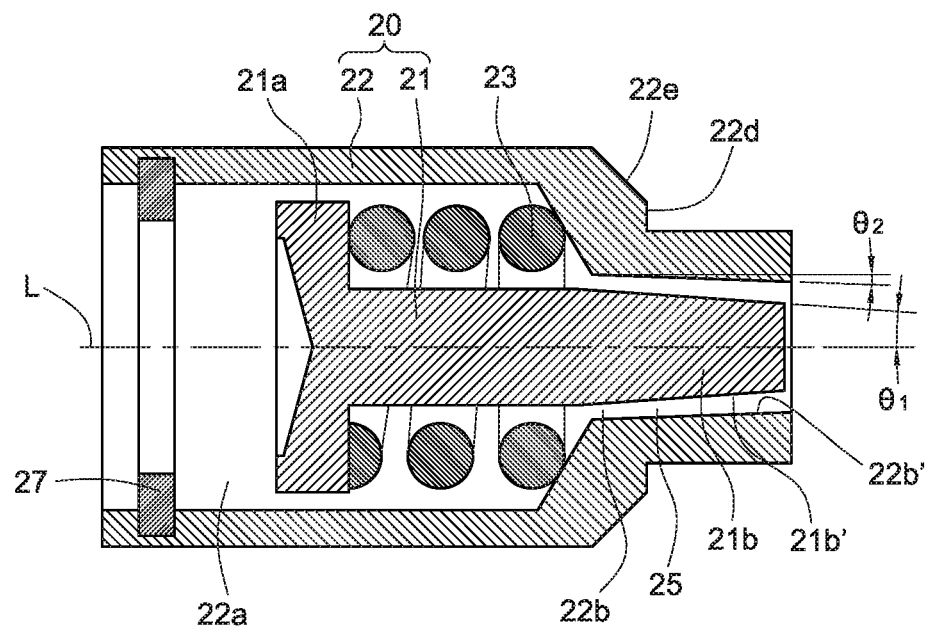
FIG. 4 is a partially enlarged cross-sectional view of FIG. 3 of the present invention illustrating a state where a normally-open draining gap can be formed between the inner valve plug and the closed valve and the inner valve hole within a limited time.

Please refer to FIG. 4 disclosing an enlarged cross-sectional view of the relative arrangement between the inner valve plug 21 and the inner valve hole 22b in the implementation shown in FIG. 3 to explain the inner valve plug 21 and the normally-open draining gap 25 is formed in the outer valve plug 22 (inclusive), and the normally-open draining gap 25 is communicated between the pressurized oil collecting cavity 11 and the oil returning channel 13.

Specifically, FIG. 4 reveals that the outer wall of the stopper rod 21b forms a ring-shaped first oblique cone surface 21b', and the inner valve hole 22b is formed with the second oblique cone surface 22b' of a ring shape relative to the first oblique cone surface 21b'. The state of FIG. 4 shows that when the inner valve plug 21 senses the high oil pressure driving of the oil at the inlet end 13a and the inner layer elastic element 23 is compressed to the maximum load limit (that is, when the valve is closed to the limit), the first oblique cone surface 21b' and the second oblique cone surface 22b' exclude from contacting. In another way, the so-called exclusion of contacting means that the inner valve plug 21 senses the inner pressure of the pressurized oil collecting cavity 11 under the load of the combined elastic force of the inner layer elastic element 23 and the outer layer elastic element 24, when the maximum oil pressure is gathered, there is still no contact between the first oblique cone surface 21b' and the second oblique cone surface 22b'. In other words, the normally-open draining gap 25 is formed between the stopper rod 21b and the inner valve hole 22b. More specifically, the normally-open draining gap 25 is formed on the first oblique cone surface 21b'. The oil flow is controlled between the first oblique cone surface 21b' and the second oblique cone surface 22b', and exists in a pressure-exhaust form that is never closed, so as to provide a hydraulic instrument that small-flow pressure relief can still pass the normally-open type under the condition of high oil pressure load. The small-flow pressure relief function of the normally-open draining gap 25 prevents a dangerous situation in which a heavy object lifted by a hydraulic instrument cannot be lowered and reset.

It must be added here that, in the implementation shown in FIG. 4 of the present invention, the status that the slopes of the first oblique cone surface 21b' and the second oblique cone surface 22b' with respect to the axis line L of the inner valve plug 21 are the same (i.e. different) can be excluded. The same slope exclusion means that the inclined angle θ1 held by the first oblique cone surface 21b' is not equal to the relative inclined angle θ2 of the second oblique cone surface 22b'. According to this implementation of the present invention, it is beneficial to more sensitively control the valve opening allowance of the normally-open draining gap 25, so as to facilitate more sensitive control of the hydraulic equipment. After lifting heavy objects, it can be slowly lowered and reset at a low flow rate (that is, the piston rod in pressurized oil collecting cavity is released and reset) to have the speed of the piston rod released.

Please refer to FIGS. 2 and 3, and explain that a ring groove 22c is also formed between the throttling valve chamber 15 and the oil returning channel 13, and the ring groove 22c can be formed by extending the outer valve hole 16 to connect to the oil returning channel 13. The diameter of the ring groove 22c is between the outer valve hole 16 and the hole diameter of the oil returning channel 13. The outer wall of the outer valve plug 22 forms a retaining wall 22d, and the outer layer elastic element 24 is installed in the between the groove wall of the ring groove 22c and the retaining wall 22d.

Among them, it must be noted that the outer layer valve hole 16 may be formed as a ring-shaped oblique tapered hole wall 16a, and the outer wall of the outer layer valve plug 22 is adjacent to the retaining wall 22d to form a ring-shaped oblique tapered plug wall 22e, and the slopes of the oblique tapered hole wall 16a and the oblique tapered plug wall 22e with respect to the axis line L of the outer valve plug 21 are the same, so that under the state that the outer valve plug 22 is loaded with the elastic force of the outer layer elastic element 24, the oil pressure in the pressurized oil collecting cavity 11 and in the inlet end 13a can be sensed, and the valve opening allowance of the outer valve hole 16 and the timing of completely closing can be controlled.

In the above implementation of the present invention, the inner layer elastic element 23 and the outer layer elastic element 24 may both be made of a spiral compression spring or other equivalent elements capable of providing elastic force, such as rubber, a spring, an elastomer, etc. The elastic force generated by the inner layer elastic element 23 and the outer layer elastic element 24 may be the same or different. The outer valve plug 22 is used as a load to the elastic force of the outer layer elastic element 24 to control the valve opening allowance and valve closing timing of the outer valve hole 16. The inner valve plug 21 is used as a load to the unified elastic force of the inner layer elastic element 23 and the outer elastic element 24 to control the valve opening margin of the inner valve hole 22b. According to this design, regardless of whether the elastic forces of the inner layer elastic element 23 and outer elastic element 24 are the same, the closing force of the inner valve plug 21 must be greater than the closing force of the outer valve plug 22.

Figure 5:
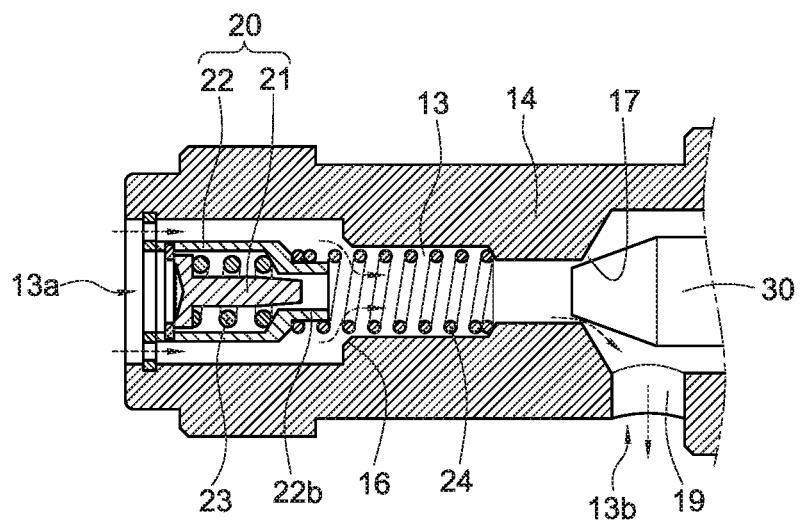
FIG. 5 is the first operation schematic diagram of FIG. 3 of the present invention illustrating the valve status when the low pressure oil is loaded.
Figure 6:
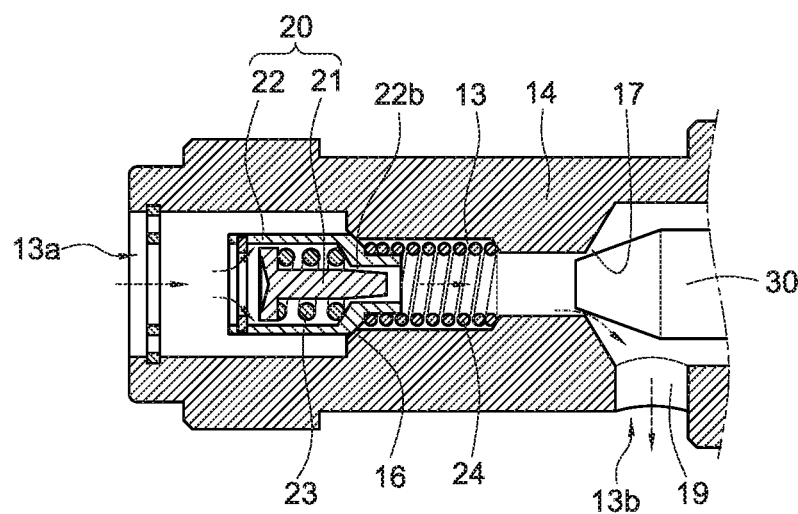
FIG. 6 is a second operation schematic diagram of FIG. 3 of the present invention illustrating the valve status when the medium pressure oil is loaded.
Figure 7:
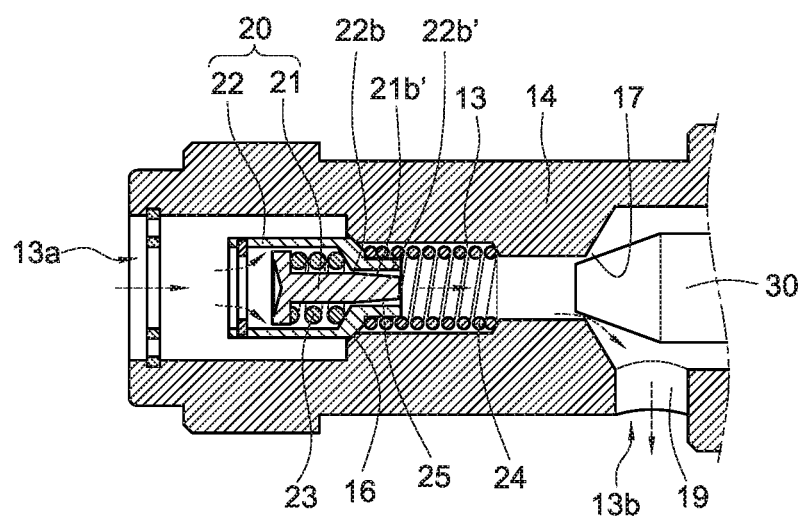
FIG. 7 is a schematic diagram of the second operation of FIG. 3 of the present invention illustrating the valve status when the high pressure oil is loaded.

Next, please refer to FIG. 5 to FIG. 7 in order. Among them, FIG. 5 reveals a schematic diagram of the operation of the embodiment shown in FIG. 3 to illustrate when the user drives the oil returning valve plug 30 to open the oil return valve hole 17, the elastic forces selected by the inner layer elastic member 23 and the outer layer elastic member 24 are respectively greater than the oil pressure of the inlet end 13a, so that the inner valve plug 21 and the outer valve plug 22 in the throttling valve set 20 are in the open state respectively. In other words, at this moment, the outer layer elastic member 24 is pushed against the outer valve plug 22 to open the outer valve hole 16 and the inner layer elastic member 23 is pushed against the inner valve plug 21 opens the inner valve hole 22b, and the oil in the pressurized oil collecting cavity 11 sequentially passes through the inner valve hole 22b and the outer valve hole 16 of the inlet end 13a, the oil returning channel 13, the oil returning valve hole 17 of the outlet end 13b and the oil return hole 19 to return to the pressurized oil discharging cavity 12 so that the piston rod (not shown) in the pressurized oil collecting cavity 11 of the hydraulic instrument is maintained at the lowered reset position.

FIG. 6 reveals a schematic diagram of the operation of the embodiment shown in FIG. 3 under a medium pressure load, illustrating that when the oil pressure at the inlet end 13a is in a medium pressure (between low pressure and high pressure) load state, and the user drives the oil returning valve plug 30 and the oil returning valve hole 17 is opened, the outer valve plug 22 that is only loaded with the elastic force of the outer layer elastic element 24 is first driven by the medium pressure oil to control the valve opening and valve closing timing of the outer valve hole 16. When the outer valve plug 22 completely closes the outer valve hole 16 (closed valve), the oblique tapered plug wall 22e and the oblique tapered hole wall 16a are in close contact with each other, and the medium pressure oil at the inlet end 13a is blocked from passing through the outer valve hole 16. At this moment, the inner valve plug 22 that carries the combined elastic force of the inner layer elastic element 23 and the outer layer elastic element 24 can be maintained in a fully opened state of the inner valve hole 22b without being affected by the medium pressure oil at the inlet end 13a. In other way the inner valve plug 22 can also reduce the effect of the elastic force because the outer layer elastic element 24 has been compressed by the outer valve plug 22, so that the inner valve plug 21 is pushed in by the action of the medium pressure oil at the inlet end 13a and the layer elastic element 23 is partially compressed to control the valve opening margin of the inner valve hole 22b, so that the oil in the pressurized oil collecting cavity 11 can sequentially pass through the inner valve hole 22b (or the inner valve hole 22b and the outer valve hole 16), the oil returning channel 13, the oil returning valve hole 17 and the oil return hole 19 at the outlet end 13b to return into the pressurized oil discharging cavity 12. In this way, by the layered control of the valve opening margin of the outer valve hole 16 and the inner valve hole 22b it can further obtain the multi-stage throttling control function, in order to control the reset speed of the hydraulic instrument when lifting heavy objects in the medium pressure section of the oil.

FIG. 7 reveals a schematic diagram of the operation of the embodiment shown in FIG. 3 under a high-pressure load, illustrating that when the oil pressure at the inlet end 13a is under a high-pressure load, and the user drives the oil returning valve plug 30 to open the oil returning valve hole 17, the outer valve plug 22 can completely close the outer valve hole 16 against the elastic force of the outer layer elastic element 24, and the inner valve plug 21 can also completely overcome the combined elastic force of the inner elastic element 23 and the outer elastic element 24 so that the normally-open draining gap 25 retains only a minimum valve opening allowance. In other words, under the load state of the high-pressure oil, the high-pressure oil at the inlet end 13a can still pass through normally-open draining gap 25 with a minimum valve opening margin located between the first oblique cone surface 21b' and the second oblique cone surfaces 22b', and the slow-flow drain flows into the oil returning channel 13, and then sequentially passes through the oil returning valve hole 17 of the outlet end 13b and the oil returning hole 19 to flow back into the pressurized oil discharging cavity 12 and to flow back into the pressurized oil discharging cavity 12. In this way, the design of the minimum valve opening allowance of the normally-open draining gap 25 can be used to make the hydraulic equipment under the high pressure of the oil can still be slowly lowered and reset when lifting heavy objects in sections to achieve safety.

Figure 8:
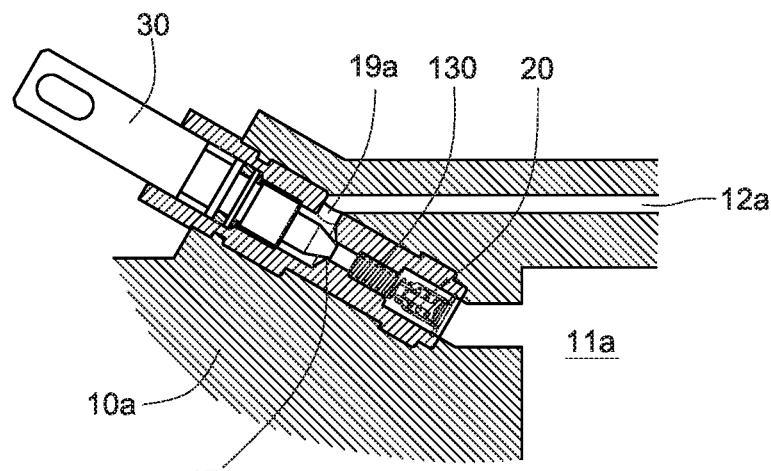
FIG. 8 is a cross-sectional view of a third embodiment of the present invention illustrating the configuration of the oil returning valve set when the hydraulic instrument is a jack.

Please also refer to FIG. 8 for a cross-sectional view of the configuration when the oil pressure air compressor is a jack, and it is shown that the pressurized oil collecting cavity can be regarded as the inner oil cylinder 11a of a piston rod (not shown) of the jack, and the row. The pressurized oil discharging cavity can be regarded as the oil tank 12a of the jack, and an oil returning channel 130 communicating with the oil tank 12a and the oil returning hole 19a is also provided in the machine body 10a of the jack. When the oil returning valve plug 30 opens the oil returning valve hole 17, at this time, the high, medium, and low-pressure oil that has been throttled by the throttle group 20 can be discharged to the oil tank 12a through the oil returning channel 130, and then the pressure drop can be reset.

Figure 9:
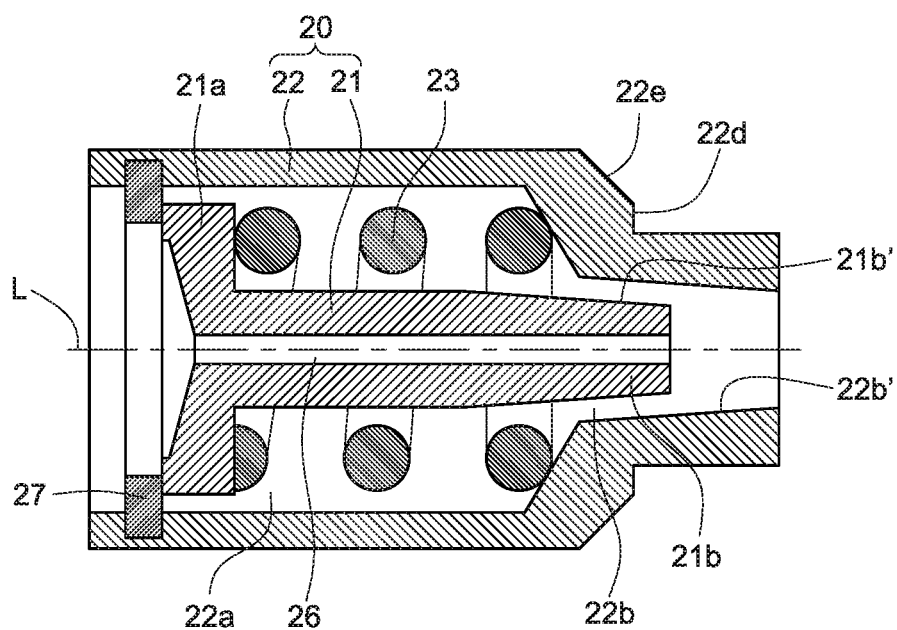
FIG. 9 is a cross-sectional view of a fourth embodiment of the present invention illustrating an embodiment in which the normally-open draining gap shown in FIG. 3 is replaced with a fixed aperture draining hole.

Please refer to FIG. 9 further, to reveal another embodiment of the above-mentioned normally-open draining gap, and explain that the normally-open draining gap can also be implemented as an oil draining hole 26, and directly arranged on the inside plug body of the inner valve plug 21. The inside plug body of the inner valve plug 21 is further communicated between the pressurized oil collecting cavity 11 and the oil returning channel 13. According to this implementation, the slopes of the first oblique cone surface 21b' and the second oblique cone surface 22b' described in FIG. 4 may be the same, so that when the inner valve plug 21 is subjected to a high oil pressure load, the stopper rod 21b can completely close the inner valve hole 22b, so that the oil draining hole 26 (that is, the normally-open draining gap) does not tangled with the valve opening flow of the inner valve hole 22b, and directly passes through the oil draining hole 26. The fixed aperture is provided to control the speed at which the oil hydraulic equipment can slowly lower the reset speed after lifting a heavy object, so it also belongs to the application scope contemplated by the present invention.

It must be noted that the valve opening allowance of the plurality of valve holes described above in the present invention are all controlled by providing a range of elastic force that can be compressed by each of the elastic elements carried by the plurality of valve plugs. In addition, the present invention is not limited to the embodiment described above. The hydraulic instrument may be a jack, the pressurized oil collecting cavity may be an oil chamber configured with a piston, and the pressurized oil discharging cavity may be an oil tank. Essentially, as long as it is a hydraulic instrument, both the pressurized oil collecting cavity for collecting the oil pressure and the pressurized oil discharging cavity for draining the oil pressure belong to the application scope contemplated by the present invention and can be covered.

Therefore, the above embodiments merely express the preferred embodiments of the present invention, but cannot be understood as limiting the scope of patents of the present invention. The present invention shall be subject to the content of the claims defined in the scope of the patent application.

We claim:

1. An oil returning valve set with multi-stage throttling control comprising:
   an oil returning channel formed in an oil hydraulic equipment, and both ends of the oil returning channel are respectively connected to a pressurized oil collecting cavity and a pressurized oil discharging cavity of oil in an oil hydraulic equipment;
   a plurality of throttling valve plugs arranged at an inlet end of the oil returning channel, and controlling the oil in the pressurized oil collecting cavity to flow to the oil returning channel; and
   an oil returning valve plug arranged at an outlet end of the oil returning channel, and controlling the flow of oil in the oil returning channel to the pressurized oil discharging cavity;
   wherein the plurality of the throttling valve plugs are arranged in parallel and have different elastic forces, a normally-open draining gap is formed between the plurality of throttling valve plugs, and the normally-open draining gap is used for connecting between the pressurized oil collecting cavity and the oil returning channel.

2. The oil returning valve set with multi-stage throttling control as claimed in claim 1, wherein a valve seat is arranged between the pressurized oil collecting cavity and the pressurized oil discharging cavity of the oil hydraulic equipment, and the oil returning channel is arranged in the valve seat and further it is formed in the oil hydraulic equipment.

3. The oil returning valve set with multi-stage throttling control as claimed in claim 1, wherein the plurality of the throttling valve plugs comprise an inner valve plug and an outer valve plug, and the inner valve plug is coaxially sleeved and arranged on an inside of the outer valve plug, and the normally-open draining gap is formed between the inner valve plug and the outer valve plug.

4. The oil returning valve set with multi-stage throttling control as claimed in claim 3, wherein an inner valve plug accommodation chamber and an inner valve hole communicating with each other are formed in the outer valve plug, and the inner valve plug in cooperation with an inner layer elastic element is disposed in the inner valve plug accommodation chamber, and the inner valve plug is formed with a stopper rod that can move through the inner valve hole, and the normally-open draining gap is formed between the stopper rod and the inner valve hole.

5. The oil returning valve set with multi-stage throttling control as claimed in claim 4, wherein an annular first oblique cone surface is formed on an outer wall of the stopper rod, and the inner valve hole is oppositely formed with an annular second oblique cone surface, the first oblique cone surface and the second oblique cone surface are excluded from contacting, so that the normally-open draining gap is formed between the first oblique cone surface and the second oblique cone surface.

6. The oil returning valve set with multi-stage throttling control as claimed in claim 5, wherein slopes of the first oblique cone surface and the second oblique cone surface with respect to an axis line of the inner valve plug are not the same.

7. The oil returning valve set with multi-stage throttling control as claimed in claim 4, wherein an annular hat portion is formed at an end of the stopper rod of the inner valve plug, and the diameter of the hat portion is relatively larger than that of the stopper rod, the inner layer elastic element is disposed between the hat portion and a wall surface of the inner valve plug accommodation chamber.

8. The oil returning valve set with multi-stage throttle control as claimed in claim 1, wherein the plurality of the throttling valve plugs comprise an inner valve plug and an outer valve plug, the inner valve plug is coaxially sleeved and arranged on an inside of the outer valve plug, the normally-open draining gap is an oil draining hole with a fixed aperture, the oil draining hole is formed inside a plug body of the inner valve plug, and further the outer valve plug communicates between the pressurized oil collecting cavity and the oil returning channel.

9. The oil returning valve set with multi-stage throttle control as claimed in claim 3, wherein a throttling valve chamber for communicating with the pressurized oil collecting cavity and an outer valve hole are formed at the inlet end, and the outer valve plug cooperates with an outer layer elastic element and is disposed in the throttling valve chamber to sense the oil pressure in the pressurized oil collecting cavity, and then controls the opening and closing of the outer valve hole.

10. The oil returning valve set with multi-stage throttling control as claimed in claim 9, wherein a ring groove is formed between the throttling valve chamber and the oil returning channel, an outer wall of the outer valve plug forms a retaining wall, and the outer layer elastic element is installed between of the ring groove and the retaining wall.

11. The oil returning valve set with multi-stage throttle control as claimed in claim 8, wherein a throttling valve chamber for communicating with the pressurized oil collecting cavity and an outer valve hole are formed at the inlet end, and the outer valve plug cooperates with an outer layer elastic element and is disposed in the throttling valve chamber to sense the oil pressure in the pressurized oil collecting cavity, and then controls the opening and closing of the outer valve hole.

12. The oil returning valve set with multi-stage throttling control as claimed in claim 11, wherein a ring groove is formed between the throttling valve chamber and the oil returning channel, an outer wall of the outer valve plug forms a retaining wall, and the outer layer elastic element is installed between the ring groove and the retaining wall.

13. The oil returning valve set with multi-stage throttling control as claimed in claim 11, wherein the outer valve hole is formed with a ring-shaped oblique tapered hole wall, and the outer valve plug is formed with a ring-like oblique tapered plug wall, the slopes of the oblique tapered hole wall and the oblique tapered plug wall with respect to an axis of the outer valve plug are the same.

14. The oil returning valve set with multi-stage throttling control as claimed in claim 1, wherein the plurality of the throttling valve plugs comprise an inner valve plug and an outer valve plug, and the outer valve plug is loaded with an elastic force of an outer layer elastic element, the inner valve plug is loaded with an integrated elastic force of an inner layer elastic element and the outer layer elastic element.

15. The oil returning valve set with multi-stage throttle control as claimed in claim 1, wherein the oil returning channel between the inlet end and the outlet end is arranged in a straight line along an axis line, and the plurality of throttling valve plugs and the oil returning valve plug are arranged along the axis line.

16. The oil returning valve set with multi-stage throttling control as claimed in claim 1, wherein the outlet end forms an oil returning valve hole and a reflux valve chamber which communicate with the pressurized oil discharging cavity, the oil returning valve plug is arranged in the reflux valve chamber for regulating the opening and closing of the oil returning valve hole, an oil returning hole is also formed at the outlet end, and the oil returning valve hole communicates with the oil returning hole when the oil returning valve hole is opened.

17. The oil returning valve set with multi-stage throttling control as claimed in claim 1, wherein the oil hydraulic equipment is a jack, the pressurized oil collecting cavity is an inner oil cylinder of the jack, and the pressurized oil discharging cavity is an oil tank of the jack.

18. The oil returning valve set with multi-stage throttling control as claimed in claim 9, wherein the outer valve hole is formed with a ring-shaped oblique tapered hole wall, and the outer valve plug is formed with a ring-like oblique tapered plug wall, the slopes of the oblique tapered hole wall and the oblique tapered plug wall with respect to an axis of the outer valve plug are the same.

* * * * *